United States Patent
Kim et al.

(10) Patent No.: US 12,242,146 B2
(45) Date of Patent: Mar. 4, 2025

(54) DISPLAY DEVICE AND ASSEMBLING METHOD THEREOF

(71) Applicant: LG Display Co., Ltd., Seoul (KR)

(72) Inventors: Yeongho Kim, Paju-si (KR); Inkwon Kim, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/136,478

(22) Filed: Dec. 29, 2020

(65) Prior Publication Data

US 2021/0200018 A1 Jul. 1, 2021

(30) Foreign Application Priority Data

Dec. 31, 2019 (KR) .................. 10-2019-0179735

(51) Int. Cl.
*G02F 1/1333* (2006.01)

(52) U.S. Cl.
CPC .. *G02F 1/133322* (2021.01); *G02F 1/133314* (2021.01)

(58) Field of Classification Search
CPC ......... G02F 1/133322; G02F 1/133314; G02F 2201/465; G02F 1/133325; G02F 1/133317; G02F 1/133308; G02F 2201/46
See application file for complete search history.

(56) References Cited

U.S. PATENT DOCUMENTS

| | | | | |
|---|---|---|---|---|
| 2009/0147171 A1* | 6/2009 | Yang | ................. | G02F 1/133308 445/24 |
| 2012/0268686 A1* | 10/2012 | Lee | ................. | G02F 1/133308 349/59 |
| 2013/0321732 A1* | 12/2013 | Tang | ................. | G02F 1/13454 445/24 |
| 2015/0277179 A1* | 10/2015 | Nishi | ................. | G02F 1/1335 349/58 |
| 2016/0187710 A1* | 6/2016 | An | ................. | G02F 1/133308 349/58 |
| 2016/0306394 A1* | 10/2016 | Kuo | ................. | G06F 1/1626 |
| 2016/0349568 A1* | 12/2016 | Oh | ................. | G02B 6/0088 |
| 2018/0364517 A1* | 12/2018 | Oh | ................. | G02F 1/133606 |
| 2019/0196251 A1* | 6/2019 | Woo | ................. | G02B 6/0055 |

FOREIGN PATENT DOCUMENTS

| | | |
|---|---|---|
| CN | 106200116 A | 12/2016 |
| CN | 108508653 A | 9/2018 |
| KR | 10-2008-0089897 A | 10/2008 |
| KR | 10-2017-0134798 A | 12/2017 |
| KR | 10-2018-0136816 A | 12/2018 |

* cited by examiner

*Primary Examiner* — Paisley L Wilson
*Assistant Examiner* — Agnes Dobrowolski
(74) *Attorney, Agent, or Firm* — Birch, Stewart, Kolasch & Birch, LLP

(57) ABSTRACT

A display device and a method of assembling the display device are discussed. The display device includes a liquid crystal panel displaying an image, a backlight unit providing light to the liquid crystal panel, a cover bottom having the backlight unit mounted thereon, a rear cover accommodating the cover bottom, and a guide panel surrounding an edge of the liquid crystal panel and supporting the liquid crystal panel, wherein the cover bottom and the guide panel are integrated by an insert injection method so that an end of the cover bottom is inserted into the guide panel, and an outer surface of the guide panel is obliquely provided.

18 Claims, 10 Drawing Sheets

DISPLAY DEVICE AND ASSEMBLING METHOD THEREOF

CROSS-REFERENCE TO RELATED APPLICATIONS

This application claims the priority benefit of Korean Patent Application No. 10-2019-0179735 filed on Dec. 31, 2019 in the Republic of Korea, the entire contents of which are hereby expressly incorporated herein by reference for all purposes as if fully set forth herein into the present application.

BACKGROUND OF THE INVENTION

Field of the Invention

The present disclosure relates to a display device and an assembling method of the display device.

Description of the Related Art

A display device is a device for displaying videos or images, and there are various types of display devices such as a liquid crystal display (LCD), an organic light emitting diode display (OLED), a plasma liquid crystal panel (PDP), etc. Among the display devices, the liquid crystal display capable of realizing high resolution and enabling miniaturization and enlargement is widely used.

Meanwhile, since the liquid crystal display includes a liquid crystal panel and a backlight unit, it is difficult to significantly reduce the thickness, thereby having a difficulty in implementing an ultra-thin display device. Designing the liquid crystal display to be thin can increase the aesthetic value of a product and efficiently utilize the space of the product. Therefore, a design technique is needed that is able to reduce the thickness of the liquid crystal display as much as possible.

SUMMARY OF THE INVENTION

In order to solve or address the above-mentioned problems and other limitations associated with the related art, the present disclosure is to provide a display device in which the thickness can be reduced.

A display device according to exemplary embodiments of the present disclosure includes a liquid crystal panel displaying an image, a backlight unit providing light to the liquid crystal panel, a cover bottom having the backlight unit mounted thereon, a rear cover accommodating the cover bottom, and a guide panel surrounding an edge of the liquid crystal panel and supporting the liquid crystal panel, wherein the cover bottom and the guide panel are integrated by an insert injection method so that an end of the cover bottom is inserted into the guide panel, and an outer surface of the guide panel is obliquely provided.

In addition, according to the exemplary embodiments of the present disclosure, the guide panel can be integrated with the cover bottom so as to surround side surfaces except a first side surface of the cover bottom, and can further include a partial guide panel surrounding the first side surface of the cover bottom.

In addition, according to the exemplary embodiments of the present disclosure, the guide panel can include a fastening part being extended along a rear surface of the cover bottom, the rear cover can include a locking part, and the fastening part can include a hook part inserted into the locking part.

In addition, according to the exemplary embodiments of the present disclosure, the locking part can be extended toward the cover bottom, and the hook part can be extended toward the rear cover.

In addition, according to the exemplary embodiments of the present disclosure, a first embossed part protruding toward the rear cover can be provided on the fastening part, and a second embossed part inserted into the first embossed part can be provided on the cover bottom.

In addition, according to the exemplary embodiments of the present disclosure, a fastening groove can be provided in the fastening part, and a burring hole protruding to be inserted into the fastening groove can be provided in the cover bottom.

In addition, according to the exemplary embodiments of the present disclosure, the guide panel can further include a side wall part surrounding a side surface of the liquid crystal panel and an inclined part forming an inclined appearance, and the end of the cover bottom can be inserted inside the inclined part.

In addition, according to the exemplary embodiments of the present disclosure, a thickness of the side wall part can be thinner than a thickness from a front surface of the liquid crystal panel to the rear surface of the cover bottom.

In addition, according to the exemplary embodiments of the present disclosure, the rear cover and the inclined part can form a rear appearance of the display device, and the side wall part can form a side appearance of the display device.

A display device according to the exemplary embodiments of the present disclosure includes a liquid crystal panel displaying an image, a backlight unit providing light to the liquid crystal panel, a cover bottom having the backlight unit mounted thereon, and a guide panel surrounding an edge of the liquid crystal panel and supporting the liquid crystal panel, wherein the cover bottom and the guide panel are integrated by an insert injection method so that an end of the cover bottom is inserted into the guide panel, and an outer surface of the guide panel is obliquely provided.

In addition, according to the exemplary embodiments of the present disclosure, the guide panel can include a side wall part surrounding a side surface of the liquid crystal panel and an inclined part forming an inclined appearance, and the end of the cover bottom can be inserted inside the inclined part.

In addition, according to the exemplary embodiments of the present disclosure, the cover bottom and the inclined part can form a rear appearance of the display device, and the side wall part can form a side appearance of the display device.

In the display device according to the exemplary embodiments of the present disclosure, the thickness thereof can be reduced.

In addition, the display device according to the exemplary embodiments of the present disclosure can simplify an assembling process to improve assembling performance.

DETAILED DESCRIPTION OF THE EMBODIMENTS

Hereinafter, a display device according to exemplary embodiments of the present disclosure will be described in detail with reference to the accompanying drawings. All the components of the display device according to all embodiments of the present disclosure are operatively coupled and configured. One or more features or elements of one embodiment can be applied to any other embodiment of the present disclosure.

The display device described below according to various embodiments of the present disclosure is a liquid crystal display, and according to the structure of a pixel electrode and common electrode of a liquid crystal panel, the display device can be implemented by using a twisted nematic (TN) mode, a vertical alignment (VA) mode, an in plane switching (IPS) mode, a fringe field switching (FFS) mode, or electrically controlled birefringence (ECB) mode.

In addition, the display device described below can be partially or entirely included in various applications: for example, televisions, monitors, computers, portable computers such as laptops or tablet PCs, audio/video equipment, indoor and outdoor advertising displays, vehicle displays, etc.

First Exemplary Embodiment

Figure 1:
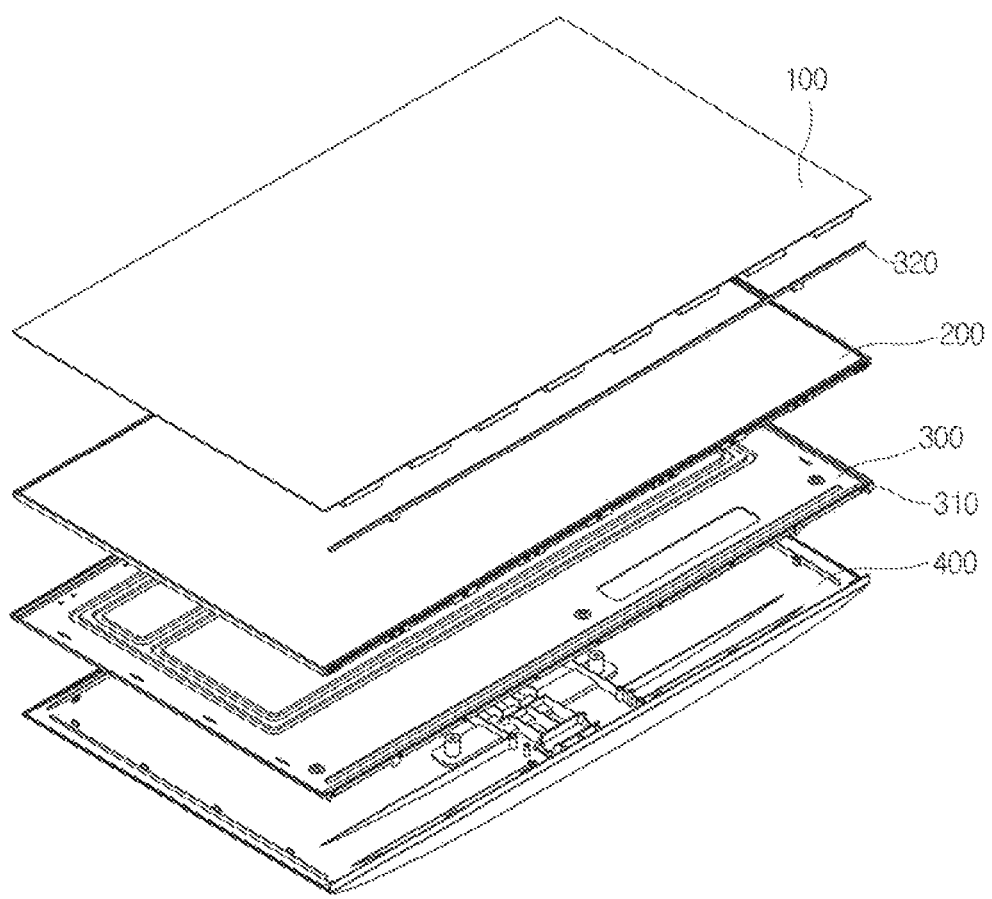
FIG. 1 is an exploded view of a display device according to a first exemplary embodiment of the present disclosure.
Figure 2:
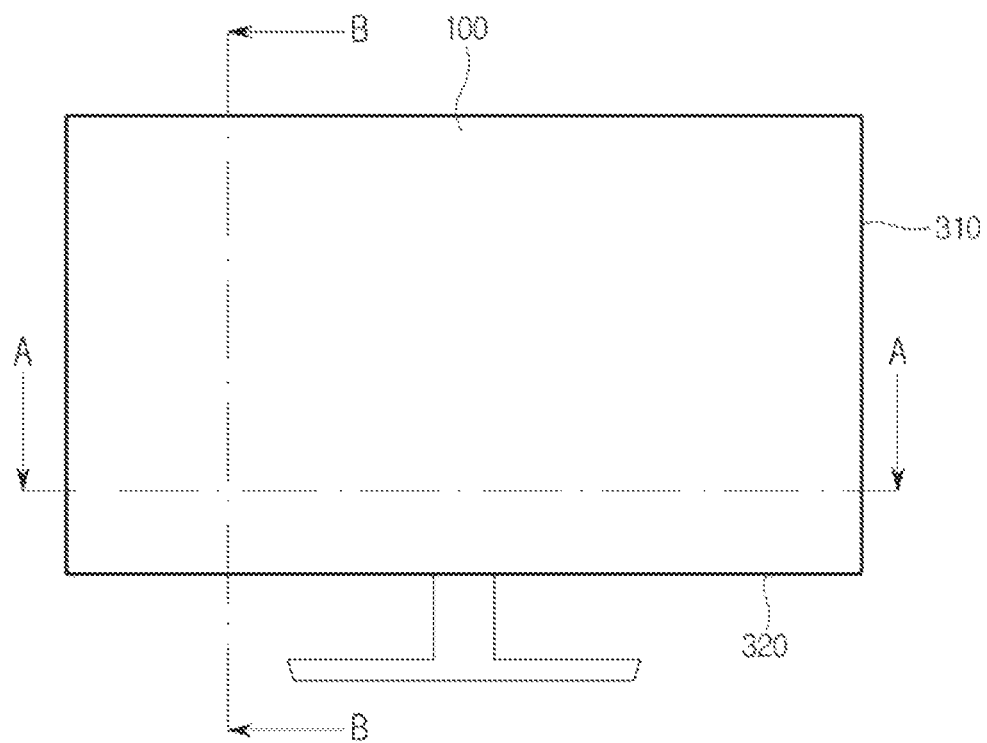
FIG. 2 is a front view of the display device according to the first exemplary embodiment of the present disclosure.
Figure 3:
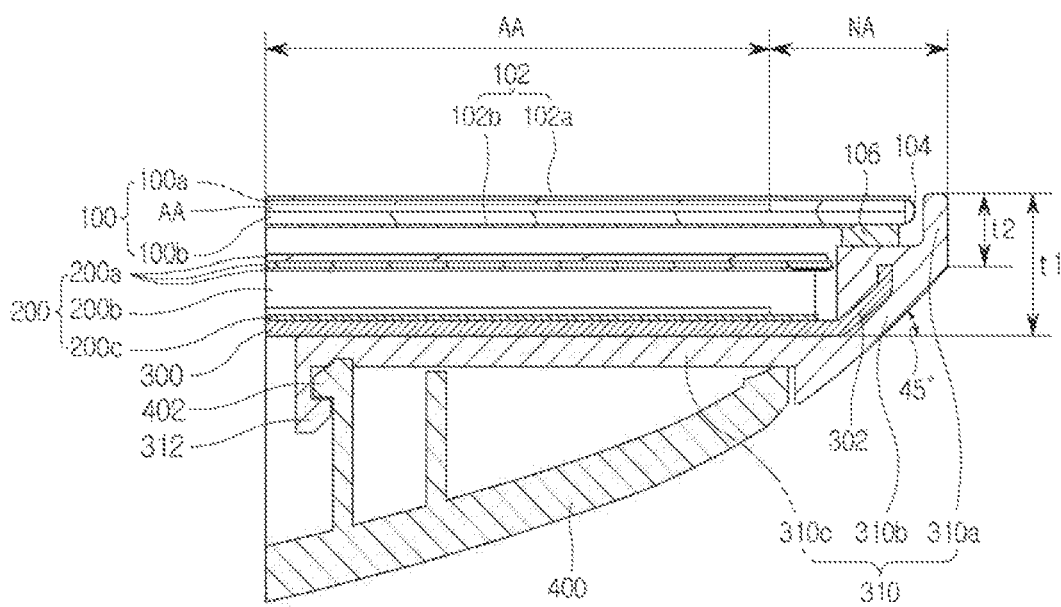
FIG. 3 is a cross-sectional view taken along line A-A of FIG. 2.
Figure 4:
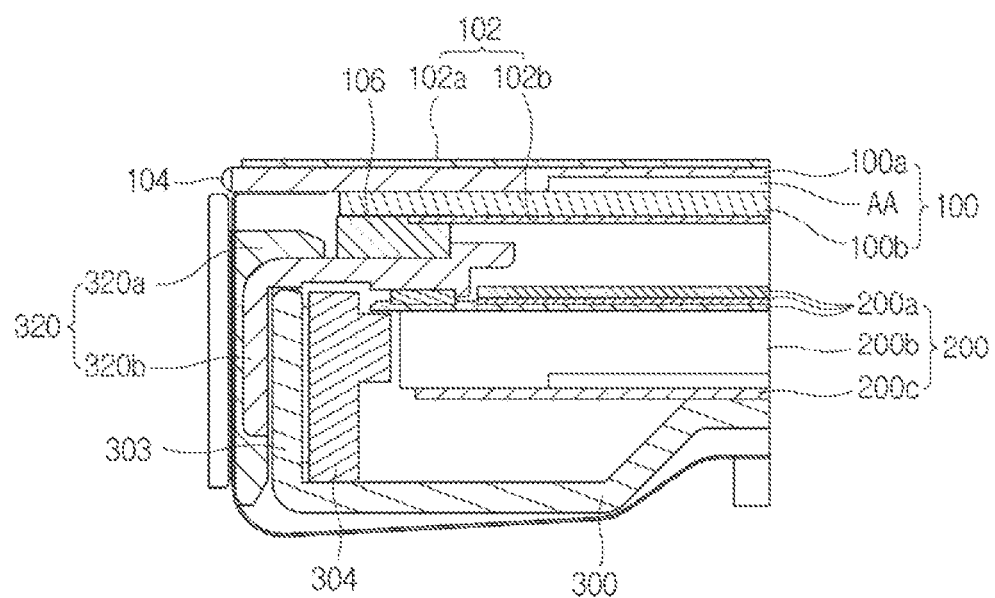
FIG. 4 is a cross-sectional view taken along line B-B of FIG. 2.

FIG. 1 is an exploded view of a display device according to a first exemplary embodiment of the present disclosure, FIG. 2 is a front view of the display device according to the first exemplary embodiment of the present disclosure, FIG. 3 is a sectional view taken along line A-A of FIG. 2, and FIG. 4 is a sectional view taken along line B-B of FIG. 2.

As shown in FIG. 1, the display device according to the first exemplary embodiment of the present disclosure includes a liquid crystal panel 100, a backlight unit 200, a cover bottom 300, a guide panel 310, and a partial guide panel 320, and a rear cover 400.

The liquid crystal panel 100 serves to display an image. In addition, by displaying a continuous image, a video can be displayed. As shown in FIG. 3, the liquid crystal panel 100 includes an upper substrate 100a including a color filter, etc., a lower substrate 100b including a switching transistor, etc., and a liquid crystal layer positioned between the upper and lower substrates. Polarizing plates 102 including a first polarizing plate 102a and a second polarizing plate 102b are attached to front and rear surfaces of the liquid crystal panel 100. A side sealing member 104 is attached to one side surface of the liquid crystal panel 100. The side sealing member 104 serves to protect the side surface of the liquid crystal panel 100. For example, the side sealing member 104 alleviates an impact due to a collision between the side surface of the liquid crystal panel 100 and the side surface of the guide panel 310. Accordingly, even when an external force is applied to the side surface of the display device, the liquid crystal panel 100 is prevented from being destroyed or damaged.

The liquid crystal panel 100 is divided into a display area AA in which an image is displayed and a non-display area NA in which the image is not displayed. The display area AA corresponds to a central area of the liquid crystal panel 100, and the non-display area NA corresponds to a partial area adjacent to the edge of the liquid crystal panel 100.

The backlight unit 200 is for providing light to the liquid crystal panel 100, and is positioned on the rear of the liquid crystal panel 100. The backlight unit 200 includes a light source, a light guide plate 200b, a reflection sheet 200c, an optical sheet 200a, etc.

The light source is provided with an organic light emitting diode (OLED), and is installed on a side surface of the light guide plate 200b. At this time, the light source can be installed on one of side surfaces or a plurality of side surfaces of the light guide plate 200b.

The light guide plate 200b is seated on the reflection sheet 200c to convert light from the light source into the surface light source. The light guide plate 200b is formed of a transparent material. For example, the light guide plate 200b is formed of a transparent polymethyl methacrylate (PMMA) or polycarbonate (PC) material. A reflection pattern for scattering and reflecting of the light can be formed on a lower surface of the light guide plate 200b. The light incident from the light source to the inside of the light guide plate 200b is scattered and reflected by the reflection pattern, and the light exceeding a certain critical angle based on a normal of the upper surface of the light guide plate 200b emits into the optical sheet 200a through the upper surface of the light guide plate 200b.

The reflection sheet 200c is provided on a lower part of the light guide plate 200b and serves to reflect light. The reflection sheet 200c is made of a material having high light reflectance ratio. For example, the reflection sheet 200c is formed of polyethylene terephthalate (PET) or polycarbonate (PC) material.

The optical sheet 200a is seated on the light guide plate 200b and serves to condense and diffuse light emitted from the light guide plate 200b. The optical sheet 200a is composed of a plurality of sheets having different structures and functions. For example, the optical sheet 200a can include a prism sheet that condenses the light emitted from the light guide plate 200b toward the front side direction of the display device to improve luminance. In addition, the optical sheet 200a can further include a protection sheet for protecting the prism sheet. In addition, sheets having various functions can be further included according to luminance properties required by the display device.

The backlight unit 200 is mounted on the cover bottom 300. The cover bottom 300 is formed of a metal material that can easily dissipate heat. The cover bottom 300 includes a plate-shaped cover bottom main body on which the backlight unit 200 is seated, and a cover bottom end 302 inserted into the guide panel 310.

The guide panel 310 surrounds the edge of the liquid crystal panel 100 and serves to support the liquid crystal panel 100. A foam pad 106 is provided between the guide panel 310 and the liquid crystal panel 100. The foam pad 106 has a structure in which adhesive is attached on both surfaces of an elastic material. The foam pad 106 attaches and fixes the liquid crystal panel 100 to the guide panel 310, and also serves to prevent inside of the display device from being penetrated by foreign matter from the outside. In addition, the foam pad 106 can include a dark colored material to prevent light leakage phenomenon in which the light passing through the light guide plate 200b leaks to the outside of the display device.

The guide panel 310 surrounds three surfaces of the liquid crystal panel 100. Describing with reference to FIG. 2, the guide panel 310 is provided on the upper surface and both side surfaces, except the lower surface, of the display device to form a part of the external appearance of the display device.

The guide panel 310 includes: a side wall part 310a surrounding the edge of the liquid crystal panel 100; an inclined part 310b having a form pad attached to an upper surface thereof to support the liquid crystal panel 100, having an inclined surface formed outside thereof, and being a part into which the cover bottom end 302 is inserted; and a fastening part 310c being in contact with a lower surface of the cover bottom 300 to be extended, so as to support the cover bottom 300, and coupled with the rear cover 400.

The side wall part 310a is extended from the inclined part 310b in the front direction. For example, when the display device is viewed from the front, the side wall part 310a forms a bezel, which is a non-display part positioned outside the liquid crystal panel 100.

The inclined part 310b is positioned on the outer surface of the backlight unit 200, and the foam pad 106 is attached to the upper surface of the inclined part 310b. As described above, the cover bottom end 302 is inserted into the inclined part 310b. At this time, the cover bottom end 302 is provided to be inclined at the same angle as the inclined surface (i.e., chamfer) forming the appearance of the inclined part 310b. In the present exemplary embodiment, the angle formed by the inclined part 310b with the planar surface (i.e., the upper surface of the liquid crystal panel 100 and the surfaces in parallel therewith) of the display device is 45 degrees.

The part from the liquid crystal panel 100 to the cover bottom 300 is also generally referred to as an LCD module (LCM). In the exemplary embodiment, the thickness t1 of the LCM is 5.6 mm. Meanwhile, in the display device according to the present exemplary embodiment, the thickness t2 of the thinnest part is 2.9 mm. Since the inclined part 310b of the guide panel 310 is inclined at 45 degrees, the thickness of the thinnest part recognizable when the display device is actually used corresponds to the thickness t2 of the side wall part 310a in the guide panel 310. This thickness is formed to be approximately 5 mm to 6 mm in a conventional display device, whereas in the present exemplary embodiment, the cover bottom end 302 is inserted into the guide panel 310 to be produced by an insert injection method and a chamfer of 45 degrees is provided at the outer edge part of the guide panel 310, whereby the thickness is greatly reduced. Here, the insert injection refers to a metal insert injection in which a metal is inserted into a plastic and integrated into a mold. For example, the guide panel 310 is made of plastic, and the cover bottom 300 is made of metal.

As shown in FIG. 4, the partial guide panel 320 is provided on the lower surface of the display device to support the liquid crystal panel 100. The partial guide panel 320 is a separate component from the guide panel 310 provided on the upper and both side surfaces of the display device. Accordingly, unlike the method in which the cover bottom end 302 is inserted into the guide panel 310 and produced by the insert injection method, the cover bottom 300 is not inserted into the partial guide panel 320, but the partial guide panel 320 is merely coupled to cover the outside of the cover bottom 300. Referring to FIG. 1, the cover bottom 300 and the guide panel 310 are integrated, but the partial guide panel 320 is shown as separated.

By being positioned on the lower surface of the display device, the partial guide panel 320 can include the storage part 320a accommodating the cover bottom 300 and a support part 320b supporting the liquid crystal panel 100 and provided with the foam pad 106 attached thereto. However, unlike in the present exemplary embodiment, it is also possible that the storage part and the support part are integrally formed.

The rear cover 400 is coupled to a hook part 312 provided on a fastening part 310c of the guide panel 310. A locking part 402 is provided at a position corresponding to the hook part 312 in the rear cover 400. As shown in FIG. 3, the hook part 312 is positioned at an end of the fastening part 310c and protrudes toward the rear cover 400. In addition, the locking part 402 protrudes toward the hook part 312 in a shape symmetrical to the hook part 312. Since the hook part 312 and the locking part 402 are made of a plastic material having a slight elasticity, the rear cover 400 can be assembled in such a method as to be press-fit on the guide panel 310.

The rear cover 400 forms a rear appearance of the display device. As described above, the side appearance of the display device is formed by the guide panel 310 and the partial guide panel 320. In addition, the front appearance of the display device is formed by the liquid crystal panel 100.

A method of assembling the display device according to the present exemplary embodiment will be described.

First, the backlight unit 200 is mounted on the cover bottom 300 and the guide panel 310. As described above, the backlight unit 200 is seated on the cover bottom 300.

In this process, since the cover bottom 300 and the guide panel 310 are integrated by the insert injection method, the assembly process is greatly simplified compared to a conventional process where combining of the cover bottom and the guide panel is further involved. Specifically, compared to the conventional assembly work performed by three people while balancing at the top and both sides of the display device, the assembly work can be done by just one person in the present exemplary embodiment, thereby significantly reducing the man-hour of the labor.

Next, the partial guide panel 320 is mounted on the lower surface of the cover bottom 300.

Next, the rear cover 400 is coupled to the guide panel 310. At this time, the hook part 312 is coupled by a method where the locking part 402 is fitted thereto.

Second Exemplary Embodiment

Figure 5:
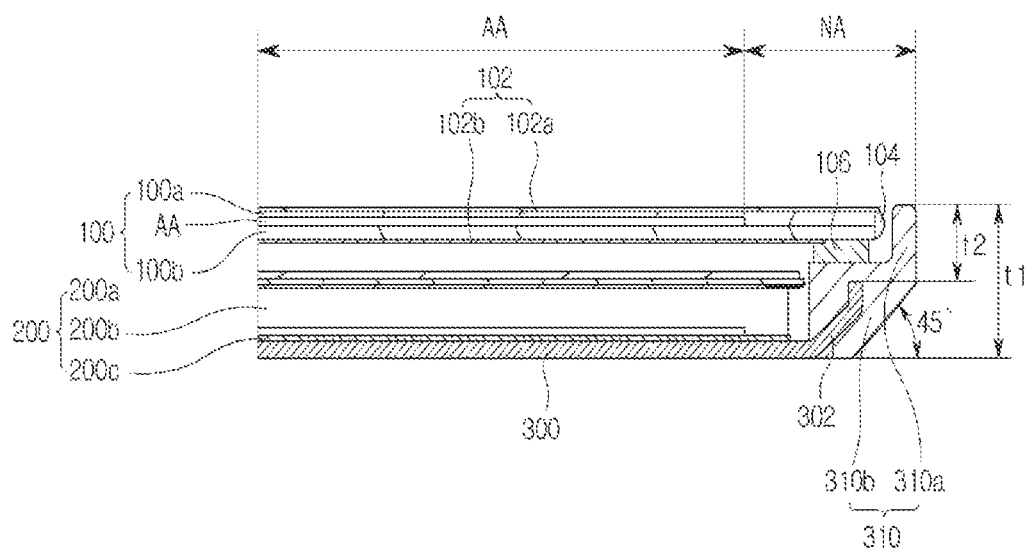
FIG. 5 is a cross-sectional view of a display device according to a second exemplary embodiment of the present disclosure.

FIG. 5 is a cross-sectional view of a display device according to a second exemplary embodiment of the present disclosure.

The display device according to the second exemplary embodiment of the present disclosure is a display device in which the rear cover 400 in the first exemplary embodiment is excluded. As shown in FIG. 5, the rear cover 400 is not provided on the rear surface of the display device, but the cover bottom 300 forms the rear appearance of the display device. The fact that the backlight unit 200 is seated on the cover bottom 300 and the guide panel 310 supports the liquid crystal panel 100 is as described in the first exemplary embodiment. In addition, the point that the cover bottom end 302 is integrated by the insert injection method so as to be inserted into the guide panel 310 is the same as the first exemplary embodiment. In addition, detailed descriptions in the second embodiment regarding the parts common to those in the first exemplary embodiment have been omitted or may have been briefly described.

The display device according to the present exemplary embodiment can be applied to a type of display device mounted or embedded on a wall surface, whereby the space occupied by the display device can be maximally reduced. At this time, when viewed from the side, the thickness of the display device corresponds to the thickness t2 of the side wall part 310a of the guide panel 310.

Third Exemplary Embodiment

Figure 6:
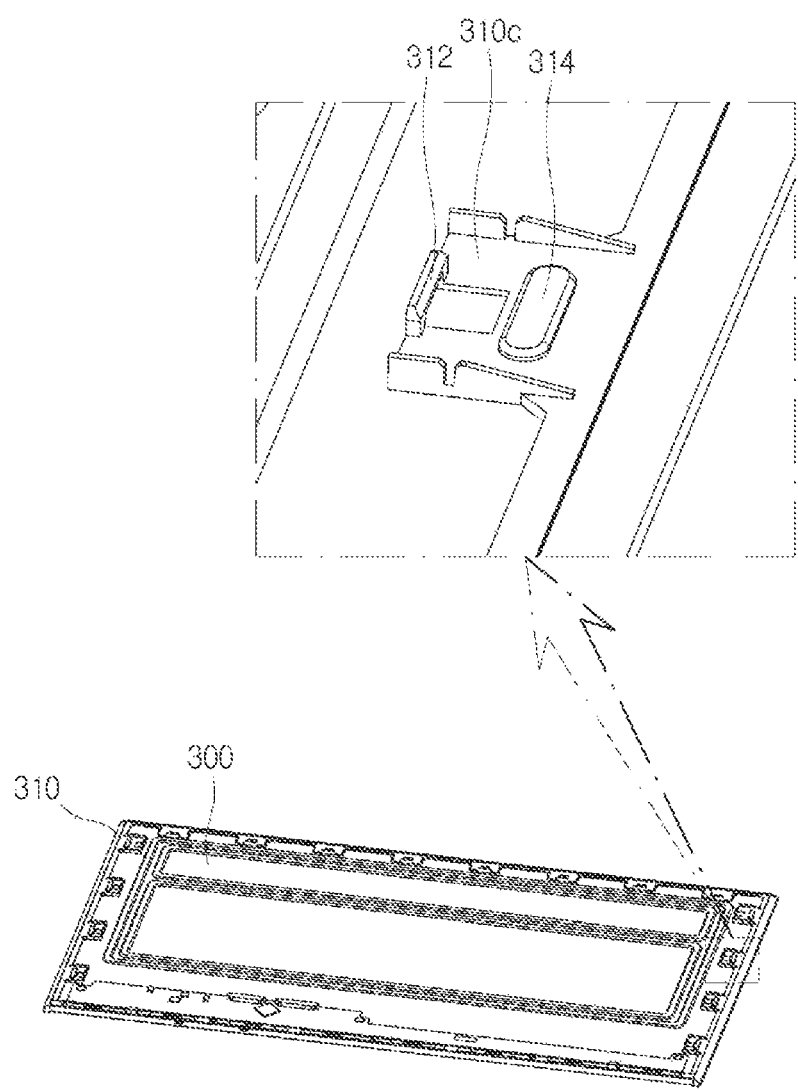
FIG. 6 is a perspective view showing a cover bottom and a guide panel in a display device according to a third exemplary embodiment of the present disclosure.
Figure 7:
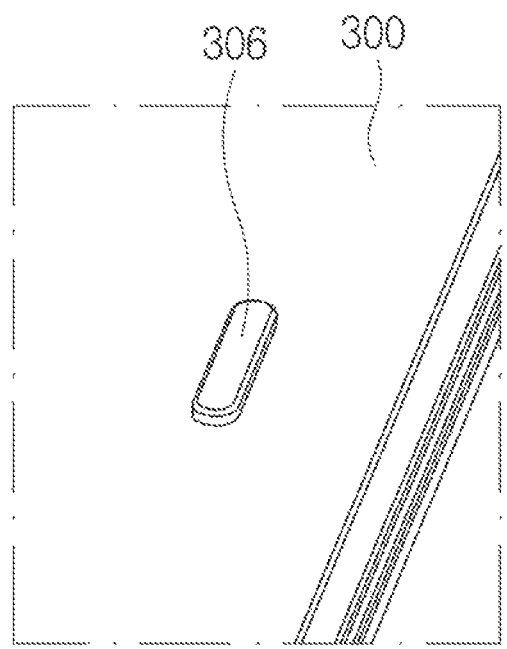
FIG. 7 is an enlarged perspective view showing a side part of the cover bottom in the display device according to the third exemplary embodiment of the present disclosure.
Figure 8:
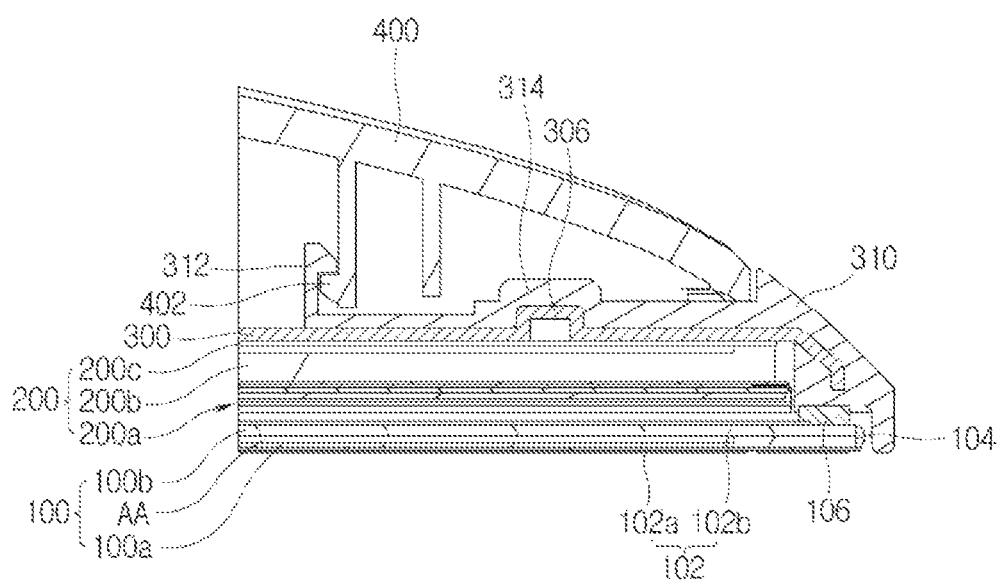
FIG. 8 is a cross-sectional view showing a side part of the display device according to the third exemplary embodiment of the present disclosure.

FIG. 6 is a perspective view showing a cover bottom and a guide panel in a display device according to a third exemplary embodiment of the present disclosure, FIG. 7 is an enlarged perspective view showing a side part of the cover bottom in the display device according to the third exemplary embodiment of the present disclosure, and FIG. 8 is a cross-sectional view showing a side part of the display device according to the third exemplary embodiment of the present disclosure.

In the display device according to the third exemplary embodiment of the present disclosure, referring to FIGS. 6-8, a first embossed part 314 is formed to be embossed so as to protrude toward the rear cover 400 on the fastening part 310c of the guide panel 310, and a second embossed part 306 is formed to be embossed at a position corresponding to the first embossed part 314 on the cover bottom 300. The second embossed part 306 is provided to have a smaller size than that of the first embossed part 314. The second embossed part 306 is fixed by being inserted into the rear surface of the first embossed part 314, thereby increasing bonding force between the guide panel 310 and the cover bottom 300. Accordingly, even in the case where the external force is applied to the guide panel 310 when assembling or mounting the display device, the guide panel 310 and the cover bottom 300 are not easily disengaged.

In addition, as shown in FIG. 6, a plurality of fastening parts 310c can be provided on the guide panel 310, wherein the first embossed parts 314 are all formed on each of the fastening parts 310c, and are positioned more outward than the hook part 312.

In the present exemplary embodiment, in addition, detailed descriptions in the third embodiment regarding the parts common to those in the first and/or second exemplary embodiment have been omitted or may have been briefly described.

Fourth Exemplary Embodiment

Figure 9:
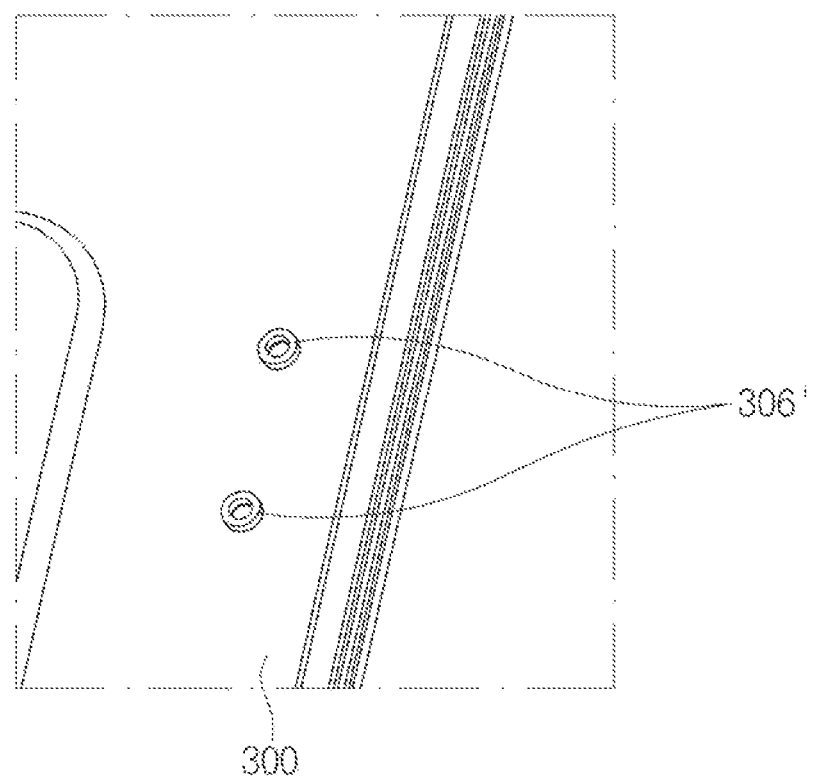
FIG. 9 is an enlarged perspective view showing a side part of a cover bottom in a display device according to a fourth exemplary embodiment of the present disclosure.
Figure 10:
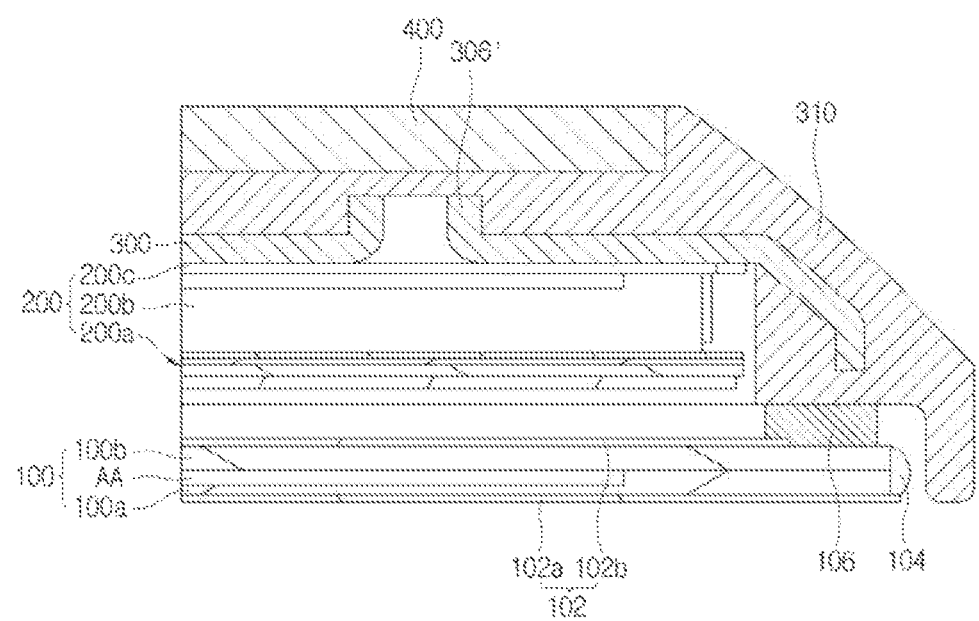
FIG. 10 is a cross-sectional view showing a side part of the display device according to the fourth exemplary embodiment of the present disclosure.

FIG. 9 is an enlarged perspective view showing a side part of a cover bottom in a display device according to a fourth exemplary embodiment of the present disclosure and FIG. 10 is a cross-sectional view showing a side part of the display device according to the fourth exemplary embodiment of the present disclosure.

As shown in FIGS. 9 and 10, in the display device according to the fourth exemplary embodiment of the present disclosure, a burring hole 306' is formed in the cover bottom 300, and a fastening groove is formed in the guide panel 310 in a position corresponding to the burring hole 306'. The burring hole 306' protrudes toward the guide panel 310 to be inserted into the fastening groove. The fastening groove is formed in the fastening part 310c of the guide panel 310. As in the case of the third exemplary embodiment described above, the burring hole 306' and the fastening groove increase the bonding force between the guide panel 310 and the cover bottom 300. Accordingly, even in the case where the external force is applied to the guide panel 310 when assembling or mounting the display device, the guide panel 310 and the cover bottom 300 are not easily disengaged.

According to the exemplary embodiments of the present disclosure described above, the outer surface of the guide panel 310 is formed to be inclined, so that the thickness of the display device can be produced to be thin. For example, by minimizing the thickness t2 recognizable when the display device is actually used, it is possible to implement an ultra-thin display device.

In addition, since the cover bottom 300 and the guide panel 310 are formed by the insert injection method, an assembly process of the cover bottom 300 and the guide panel 310 is unnecessary. Therefore, the assembly process is simplified so that the assembly performance is improved.

In addition, since there is no coupling structure such as a hook between the cover bottom 300 and the guide panel 310, there is no seam, thereby preventing a phenomenon in which light emitted from the backlight unit 200 leaks to the side or rear surface of the display device through the seam.

In the present exemplary embodiment, in addition, detailed descriptions in the fourth embodiment regarding the parts common to those in the first and/or second and/or third exemplary embodiment have been omitted or may have been briefly described.

Although the exemplary embodiments of the present disclosure have been described above with reference to the accompanying drawings, it will be understood that those skilled in the art to which the present disclosure pertains can implement the technical structure of the present disclosure in other specific forms without departing from the technical spirit or essential features thereof. Therefore, the exemplary embodiments described above are to be understood in all respects as illustrative and not restrictive. The scope of the present disclosure is indicated by the following claims rather than the above detailed description. In addition, all changes or modifications derived from the meaning and scope of the claims and equivalent concepts should be interpreted as being included in the claims of the present disclosure.

What is claimed is:

1. A display device comprising:
   a liquid crystal panel configured to display an image;
   a backlight unit configured to provide light to the liquid crystal panel;
   a cover bottom having the backlight unit mounted thereon;
   a rear cover accommodating the cover bottom; and
   a guide panel surrounding an edge of the liquid crystal panel and supporting the liquid crystal panel, the guide panel including:
      a fastening part coupled to the rear cover;
      an inclined part defining an exterior surface of the display device; and a side wall part extending directly from an end of the inclined part, spaced from the fastening part, and surrounding the edge of the liquid crystal panel, wherein an entirety of the guide panel is spaced from the liquid crystal panel, wherein the side wall part of the guide panel does not overlap the liquid crystal panel, wherein an end of the cover bottom is inserted into the guide panel, wherein the inclined part of the guide panel extends outward from the rear cover at an oblique angle with respect to an upper surface of the liquid crystal panel, wherein an inclined portion of the end of the cover bottom is inclined at substantially a same angle as the inclined part of the guide panel, wherein an end of the rear cover abuts against an edge of the guide panel defined by the fastening part of the guide panel and the inclined part of the guide panel, wherein the guide panel includes:
 a first end having the side wall part; and
 a second end having a hook part of the fastening part, the second end of the guide panel being opposite to the first end, wherein the rear cover includes a locking part that fits into a groove of the hook part to couple the locking part to the hook part of the fastening part, the locking part of the rear cover extending towards the liquid crystal panel, and wherein the hook part of the guide panel is disposed between the cover bottom and the rear cover.

2. The display device of claim 1, wherein the locking part is extended toward the cover bottom,
 wherein the hook part is extended toward the rear cover, and
 wherein the rear cover is coupled to the hook part of the guide panel at a location spaced from the end of the rear cover.

3. The display device of claim 1, wherein a first embossed part protruding toward the rear cover is provided on the fastening part, and
 wherein a second embossed part inserted into the first embossed part is provided on the cover bottom.

4. The display device of claim 1, wherein a fastening groove is provided in the fastening part, and
 wherein a burring hole protruding to be inserted into the fastening groove is provided in the cover bottom.

5. The display device of claim 1, wherein the side wall part of the guide panel surrounds a side surface of the liquid crystal panel and the inclined part forming an inclined appearance, and
 wherein the end of the cover bottom is inserted inside the inclined part of the guide panel.

6. The display device of claim 5, wherein the rear cover and the inclined part of the guide panel form a rear appearance of the display device, and
 wherein the side wall part of the guide panel forms a side appearance of the display device.

7. The display device of claim 5, wherein an entirety of the side wall part of the guide panel extends at an angle different than the angle of the inclined part of the guide panel, and
 wherein the inclined part is inclined away from the cover bottom and away from the rear cover.

8. The display device of claim 1, wherein the locking part has a shape that is symmetrical to the hook part.

9. A display device comprising:
 a liquid crystal panel configured to display an image;
 a backlight unit configured to provide light to the liquid crystal panel;
 a cover bottom having the backlight unit mounted thereon; and
 a guide panel disposed along an edge of the liquid crystal panel and supporting the liquid crystal panel; and
 a partial guide panel disposed along an edge of the liquid crystal panel, wherein an entirety of the guide panel is spaced from the liquid crystal panel, wherein a side wall part of the guide panel does not overlap the liquid crystal panel, wherein the cover bottom includes an inclined portion, wherein the guide panel includes an inclined part, wherein the inclined portion and the inclined part are inclined at substantially a same angle, wherein the partial guide panel includes:
 a storage part to accommodate the cover bottom; and
 a support part to support the liquid crystal panel, wherein the guide panel includes:
 a first end having the side wall part; and
 a second end having a hook part of the fastening part, the second end of the guide panel being opposite to the first end, wherein the display device further comprises a locking part configured to fit into a groove of the hook part to couple the locking part to the hook part of the fastening part, the locking part extending towards the liquid crystal panel, and wherein the hook part of the guide panel is disposed behind the backlight unit and overlaps with the backlight unit.

10. The display device of claim 9, wherein the guide panel includes a side wall part surrounding a side surface of the liquid crystal panel and the inclined part forming an inclined appearance,
 wherein the side wall part extends directly from an end of the inclined part, and
 wherein the end of the cover bottom is inserted inside the inclined part of the guide panel.

11. The display device of claim 10, wherein the cover bottom and the inclined part of the guide panel form a rear appearance of the display device, and
 wherein the side wall part of the guide panel forms a side appearance of the display device.

12. The display device of claim 10, wherein an entirety of the side wall part of the guide panel extends at an angle different than the angle of the inclined part of the guide panel.

13. The display device of claim 9,
 wherein the locking part has a shape that is symmetrical to the hook part.

14. A display device comprising:
 a liquid crystal panel configured to display an image;
 a backlight configured to provide light to the liquid crystal panel;
 a cover bottom having the backlight mounted thereon;
 a rear cover forming a rear appearance of the display device; and
 a guide panel surrounding an edge of the liquid crystal panel, supporting the liquid crystal panel and attached to the rear cover, the guide panel including:
  a fastening part coupled to the rear cover;
  an inclined part defining an exterior surface of the display device; and a side wall part extending directly from an end of the inclined part, spaced from the fastening part, and surrounding the edge of the liquid crystal panel, wherein an entirety of the guide panel is spaced from the liquid crystal panel, wherein the side wall part of the guide panel does not overlap the liquid crystal panel, wherein an end of the cover bottom is provided into a groove of the guide panel that is defined by the inclined part, wherein the inclined part of the guide panel extends outward from the rear cover at an oblique angle with respect to an upper surface of the liquid crystal panel, wherein a portion of the end of the cover bottom is inclined at substantially a same angle as the inclined part of the guide panel, wherein an end of the rear cover abuts against an edge of the guide panel defined by the fastening part of the guide panel and the inclined part of the guide panel, wherein the guide panel includes:
a first end having the side wall part; and
a second end having a hook part of the fastening part, the second end of the guide panel being opposite to the first end, wherein the rear cover includes a locking part that fits into a groove of the hook part to couple the locking part to the hook part of the fastening part, the locking part of the rear cover extending towards the liquid crystal panel, and wherein the hook part of the guide panel is disposed between the cover bottom and the rear cover.

15. The display device of claim 14, wherein the guide panel includes:
a first end having a side wall part extending from the inclined part of the guide panel and forming a bezel; and
a second end having a hook part, the second end of the guide panel being opposite to the first end, and
wherein the rear cover includes a locking part that fits into a groove of the hook part to couple the locking part to the hook part, the locking part of the rear cover extending towards the liquid crystal panel.

16. The display device of claim 15, wherein the rear cover is coupled to the hook part of the guide panel at a location spaced from the end of the rear cover.

17. The display device of claim 14, wherein the inclined part is inclined away from the cover bottom and away from the rear cover.

18. The display device of claim 14,
wherein the locking part has a shape that is symmetrical to the hook part.

* * * * *